US011368038B2

(12) United States Patent
Kristjansson

(10) Patent No.: US 11,368,038 B2
(45) Date of Patent: Jun. 21, 2022

(54) ADAPTIVE WIRELESS CHARGING RECEIVER LOADING

(71) Applicant: Microsoft Technology Licensing, LLC, Redmond, WA (US)

(72) Inventor: Stefan Jon Kristjansson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 16/532,774

(22) Filed: Aug. 6, 2019

(65) Prior Publication Data

US 2021/0044132 A1   Feb. 11, 2021

(51) Int. Cl.
| | |
|---|---|
| *H02J 50/80* | (2016.01) |
| *H02J 7/02* | (2016.01) |
| *H01F 38/14* | (2006.01) |
| *H04B 5/00* | (2006.01) |
| *H04W 52/04* | (2009.01) |

(52) U.S. Cl.
CPC ............. *H02J 7/025* (2013.01); *H01F 38/14* (2013.01); *H02J 50/80* (2016.02); *H04B 5/0037* (2013.01); *H04W 52/04* (2013.01)

(58) Field of Classification Search
CPC ........ H02J 7/025; H02J 50/80; H02J 7/00712; H02J 50/10; H01F 38/14; H04B 5/0037; H04W 52/04
See application file for complete search history.

(56) References Cited

U.S. PATENT DOCUMENTS

| | | |
|---|---|---|
| 8,024,012 B2 | 9/2011 | Clevenger et al. |
| 8,374,545 B2 | 2/2013 | Menegoli et al. |
| 8,803,474 B2 | 8/2014 | Hillan et al. |

(Continued)

FOREIGN PATENT DOCUMENTS

| | | |
|---|---|---|
| KR | 20130028011 A | 3/2013 |
| WO | 2010108191 A1 | 9/2010 |

OTHER PUBLICATIONS

"International Search Report and Written Opinion Issued in PCT Application No. PCT/US20/038288", dated Aug. 21, 2020, 14 Pages.

(Continued)

*Primary Examiner* — Nghia M Doan
(74) *Attorney, Agent, or Firm* — Holzer Patel Drennan

(57) ABSTRACT

A charging receiver device adapts wireless charging receiver loading. The charging receiver device receives energy wirelessly transferred from a wireless charging coil of a charging transmitter device. The charging receiver device includes a charger circuit electrically coupled to a wireless charging receiver coil to receive the charging power. The charging power is a function of a rectified receiver voltage at the charger circuit. A received power monitoring circuit monitors the rectified receiver voltage at the charger circuit, detects a deviation of the monitored rectified receiver voltage from a target rectified receiver voltage for the charging receiver device, and decreases a charge current output from the charger circuit to increase the rectified receiver voltage toward the target rectified receiver voltage, responsive to determining that the detected deviation indicates that the monitored rectified receiver voltage is less than the target rectified receiver voltage.

22 Claims, 6 Drawing Sheets

(56) References Cited

U.S. PATENT DOCUMENTS

| | | | |
|---|---|---|---|
| 9,130,369 B2 | 9/2015 | Kallal et al. | |
| 9,425,629 B2 | 8/2016 | Kim et al. | |
| 9,496,741 B2 | 11/2016 | Lee et al. | |
| 9,806,554 B2 | 10/2017 | Lee et al. | |
| 10,069,340 B2 * | 9/2018 | Yeo | H02M 7/2176 |
| 2016/0181856 A1 * | 6/2016 | Lee | H02J 50/12 |
| | | | 320/108 |
| 2016/0197513 A1 | 7/2016 | Uchimoto et al. | |
| 2016/0268834 A1 * | 9/2016 | Satyamoorthy | H01F 38/14 |
| 2016/0336757 A1 * | 11/2016 | Kasturi | B60L 3/00 |
| 2017/0338695 A1 * | 11/2017 | Port | H02J 50/12 |

OTHER PUBLICATIONS

Diaz-Corrada, Manuel, "Dynamic Power-Path Management and Dynamic Power Management", In Application Report of Texas Instruments, May 2018, 8 Pages.

\* cited by examiner

ADAPTIVE WIRELESS CHARGING RECEIVER LOADING

BACKGROUND

Inductive charging is an example wireless charging technology applied to electronic devices. Inductive charging uses an electromagnetic field to transfer energy from a first device to a second device. Electromagnetic induction can send energy from a charging transmitter of the first device through an inductive coupling to a charging receiver of the second device, for example, to charge batteries in the charging receiver device and/or to power operation of the charging receiver device. Other types of charging may include without limitation partial resonant charging and resonant charging. Examples of wireless charging can employ, without limitation, Qi-enabled (100-200 kHz inductive) coils and/or NFC (Near-Field-Communication—13.56 MHz resonant) coils in both devices to transfer the energy between the devices. However, wireless charging efficiency is highly dependent upon many factors, including without limitation coil design (including size, shape, and impedance), receiver-to-transmitter coil ratios, tuning of resonant circuits in the devices, and alignment and spacing between the coils of each device.

SUMMARY

The described technology provides a charging receiver device for adapting wireless charging receiver loading. The charging receiver device is configured to receive energy wirelessly transferred from a wireless charging coil of a charging transmitter device. The charging receiver device includes a wireless charging receiver coil configured to receive the energy wirelessly transferred from the wireless charging coil of the charging transmitter device, the energy resulting in a charging power received by the charging receiver device and a charger circuit electrically coupled to the wireless charging receiver coil to receive the charging power. The charging power is a function of a rectified receiver voltage at the charger circuit. A received power monitoring circuit is electrically coupled to the charger circuit and is configured to monitor the rectified receiver voltage at the charger circuit, detect a deviation of the monitored rectified receiver voltage from a target rectified receiver voltage for the charging receiver device, and decrease a charge current output from the charger circuit to increase the rectified receiver voltage toward the target rectified receiver voltage, responsive to determining that the detected deviation indicates that the monitored rectified receiver voltage is less than the target rectified receiver voltage.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Figure 1:
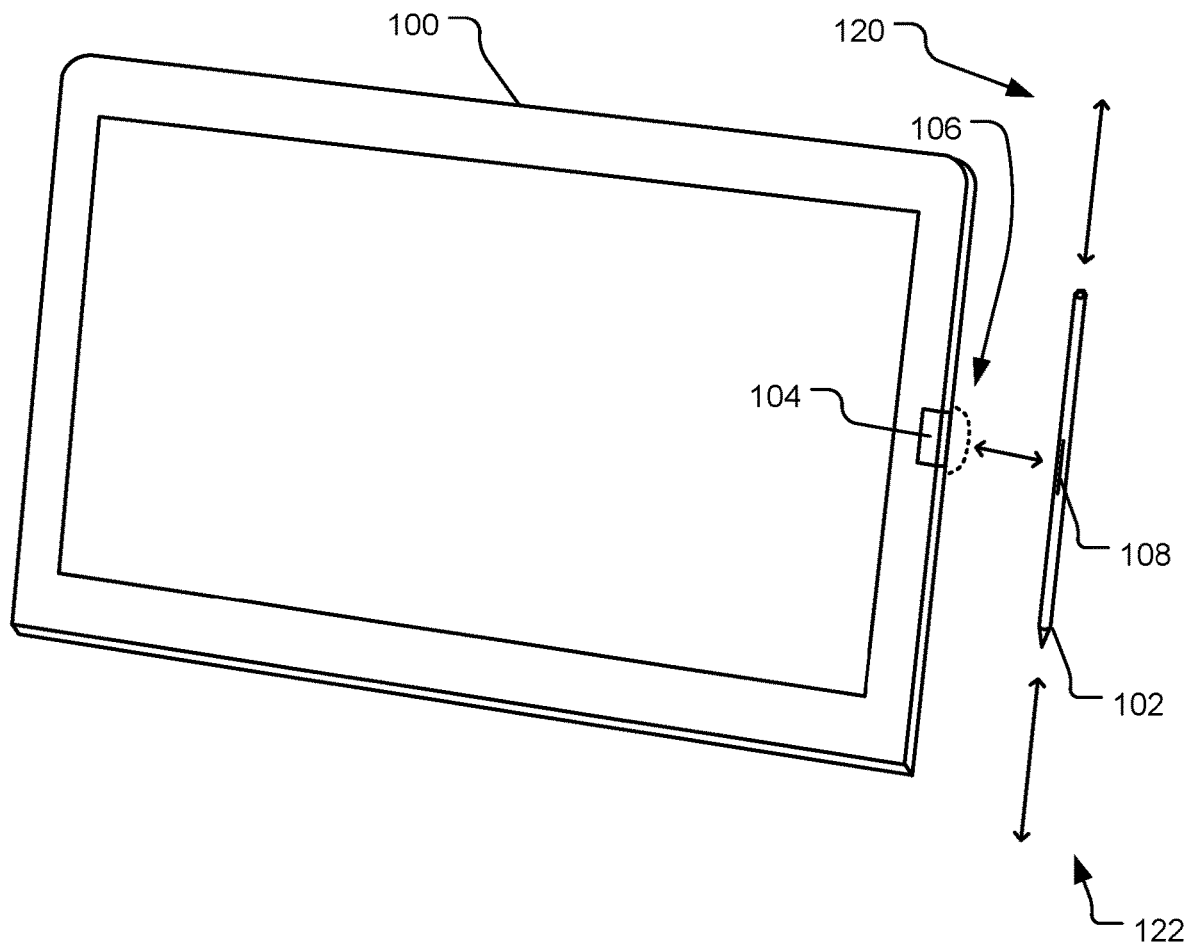
FIG. 1 illustrates a charging transmitter device (e.g., a tablet computer) and a charging receiver device (e.g., an electronic stylus).

In a typical wireless charging scenario, a charging receiver circuit of an electronic device is brought into proximity of a charging transmitter circuit of a charger device (such as a computer that provides wireless charging to an accessory, like an electronic stylus, or a wireless charger device dock charging a mobile device or a wearable device). Energy is wirelessly transferred from the charging transmitter circuit to the charging receiver circuit via electromagnetic induction.

In some implementations, the charging technique employed in charging between the charging transmitter circuit and the charging receiver circuit may include a constant current mode and a constant voltage mode in different phases of the charge. For example, a constant current mode may be applied up to about 90% of a full charge, and then a constant voltage mode may be applied for the remaining charge capacity. This technique is referred to as CC/CV charging or step charging and is often used in fast charging schemes (e.g., when charging lithium battery technologies). Other charging techniques and combinations of modes may be employed.

In certain types of wireless charging circuits, the charging receiver is configured to receive a predefined range of power from the charging transmitter circuit. For example, the predefined range of power may be set as a target charge power for the charging receiver circuit. In one implementation, the charge power in the charging receiver is a function of a rectified receiver voltage to a charger circuit, and the target charge power is a function of a target rectified receiver voltage for this rectified receiver voltage. If the charging receiver circuit determines that the power it is receiving is below this predefined range, the charging receiver circuit can communicate (e.g., through an in-band communication channel or an out-of-band communication channel, such as Bluetooth Low Energy or BLE) with the charging transmitter circuit to request that more power be provided. In response, the charging transmitter circuit can increase (e.g., incrementally) its transmitted power in an attempt to supply the power to satisfy the target charge power of the charging receiver circuit. The charging transmitter circuit typically can increase its transmitted power until it meets one or more of its own limits (e.g., a source limit, or a transmitted power limit due to a thermal limit, a voltage limit, or a current limit), after which point the charging transmitter circuit does not increase the transmitted power further. If the charging transmitter circuit reaches this limit without satisfying the target charge power of the charging receiver circuit, the charging receiver device will fail to charge at a high enough voltage to reach end of charge or may fail to reach the operating level of the integrated circuits and active components in the charging receiver, and therefore fail to charge at all.

Some wireless charging technologies, such as Qi charging and NFC charging, are also characterized by a limited working volume with respect to the wireless charging coils of the charging transmitter. The working volume represents a spatial volume extending from the charging transmitter coil in which the wireless charging receiver coil can effectively receive energy. For example, a common working volume is within about 5 mm from the wireless charging transmitter coil, although the larger the separation, the less energy is transferred from the charging transmitter coil to the charging receiver coil. As a result, various factors can diminish the effectiveness of this energy transfer during operation. For example, as the charging receiver coil get farther from the charging transmitter coils (while the charging receiver coil is still within the working volume), the efficiency of the energy transfer decreases, potentially to the point of charging failure. Accordingly, if the charging transmitter and charging receiver coils are misaligned beyond an effective distance or separated from each other by a nontrivial distance, the charging can fail. Additionally, interference from other objects, such as metal debris and or other foreign objects (not the intended charging receiver that couples the energy) around the coils can cause charging failure. The working volume for distance and offset of coils can be dependent on coil size, design, and Tx-to-Rx coil dimension ratios, and tuning, among other factors.

FIG. 1 illustrates a charging transmitter device (e.g., a tablet computer 100) and a charging receiver device (e.g., an electronic stylus 102). The tablet computer 100 includes charging transmitter circuitry 104 with a charging transmitter coil (not shown). The charging transmitter coil is capable of transferring power to charging receiver coil that is positioned within a three-dimensional working volume, represented by dashed line 106. The electronic stylus 102 includes a charging receiver coil 108 that is capable of receiving power transferred from the charging transmitter coil if the charging receiver coil 108 is positioned within the three-dimensional working volume. In typical implementations, the electronic stylus 102 is removably attached to the tablet computer 100 via one or more magnets, a bracket, or some other attaching structure. Such attaching structure can further act to align the charging receiver coil 108 with the charging transmitter coil and to maintain a small separation between the coils. Nevertheless, design tolerances, manufacturing tolerances, manufacturing errors, and normal use conditions can contribute to coil misalignment and larger-than-designed separation between the coils. Example coil misalignment is represented by the arrows 120 and 122, and example coil separation is represented by the arrow 124.

Accordingly, charging receiver circuitry within the electronic stylus 102 includes a received power monitoring circuit and a setpoint adapter circuit to adapt the wireless charging receiver loading based on a rectified receiver voltage detected at a charger circuit in the charging receiver circuity, wherein the rectified receiver voltage is indicative of the amount of received power and charging power. In one implementation, the received power monitoring circuit detects that this rectified receiver voltage resulting from the transmitted energy received at the charging receiver coil has deviated from a voltage corresponding to a target charge power. Responsive to detection of such deviation, the received power monitoring circuit signals the setpoint adapter circuit to adjust the output charge current from a charger circuit of the charging receiver circuit to accommodate the deviation as much as it is able (e.g., decreasing the output charge current from the charger circuit decreases the power drawn by the charging receiver load and decreases the charging power monitored at the charger circuit, and increasing the output charge current from the charger circuit increases the power drawn by the charging receiver load and increases the charging power monitored at the charger circuit).

Figure 2:
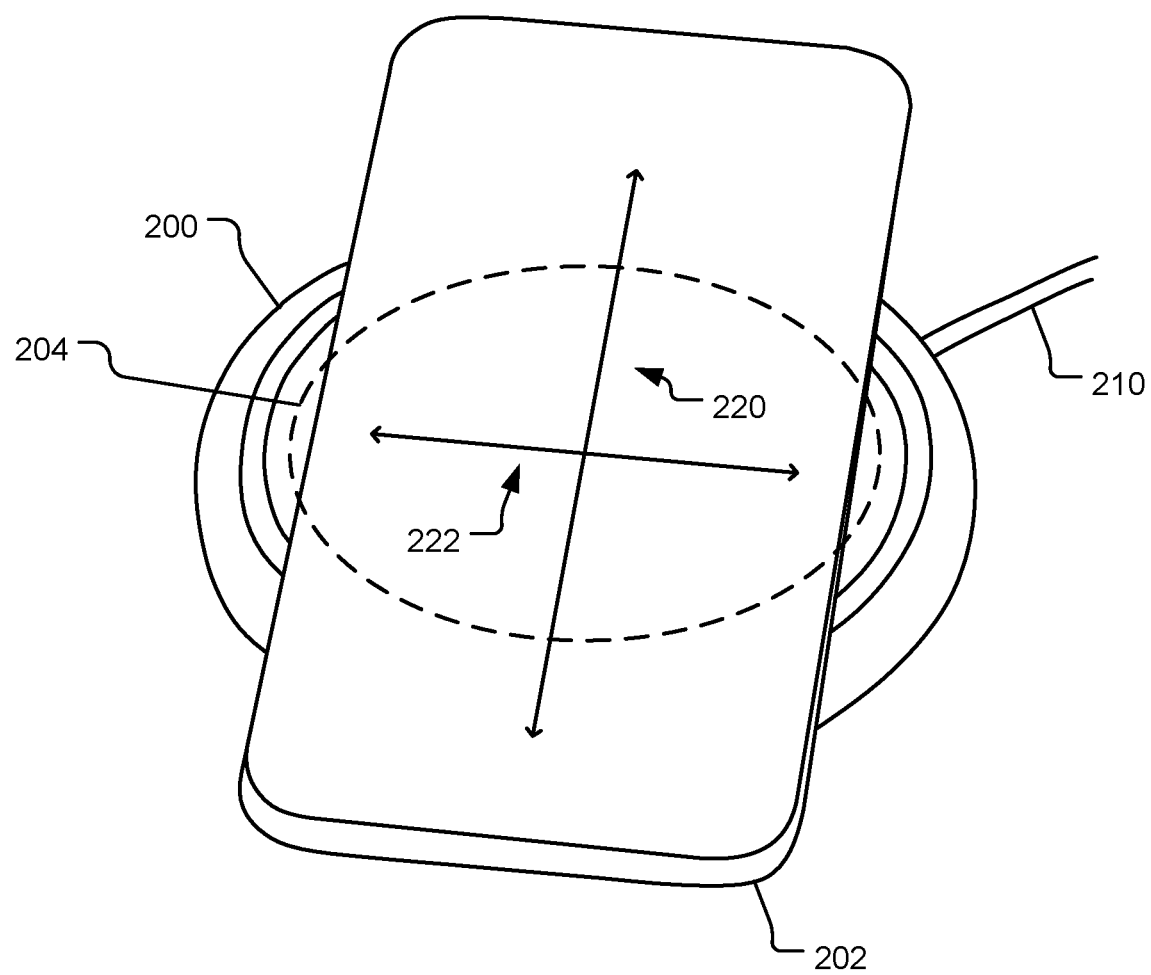
FIG. 2 illustrates another charging transmitter device (e.g., a Qi charging pad) and a charging receiver device (e.g., a mobile phone).

FIG. 2 illustrates another charging transmitter device (e.g., a Qi charging pad 200) and a charging receiver device (e.g., a mobile phone 202). The Qi charging pad 200 includes charging transmitter circuitry (not shown) with a charging transmitter coil 204 and is connected to a power source via a power cord 210. The charging transmitter coil 204 is capable of transferring power to a charging receiver coil (not shown) in the mobile phone 202. To receive the transferred power, the charging receiver coil is positioned within a three-dimensional working volume, which is centered about the charging transmitter coil 204. The charging receiver coil of the mobile phone 202 is capable of receiving power transferred from the charging transmitter coil 204 if the charging receiver coil is positioned within the three-dimensional working volume. In typical implementations, the mobile phone 202 is placed upon or in proximity to the Qi charging pad 200.

Among other factors, misaligned placement between the Qi charging pad 200 and the mobile phone 202 can contribute to coil misalignment and larger-than-expected separation between the coils of the Qi charging pad 200 and the mobile phone 202. The potential misalignment is represented by the two crossing arrows 220 and 222 near the center of the charging transmitter coil 204, although misalignment can be in any direction. Furthermore, a nontrivial separation between the coils of the charging transmitter and the charging receiver (e.g., if the mobile phone 202 is not placed flat upon the Qi charging pad 200 or if a magazine is placed between the mobile phone 202 and the Qi charging pad 200) can also reduce charging efficiency. Such misalignment and/or separation can reduce the charging efficiency between the coils and therefore reduce the power transferred to the mobile phone 202.

Accordingly, charging receiver circuitry within the mobile phone 202 includes a received power monitoring circuit and a setpoint adapter circuit to adapt the wireless charging receiver loading based on a rectified receiver voltage detected on a charger circuit in the charging receiver circuitry. In one implementation, the received power monitoring circuit detects that this rectified receiver voltage resulting from the transmitted energy received at the charging receiver coil has deviated from a voltage corresponding to a target charge power. Responsive to detection of such deviation, the received power monitoring circuit signals the setpoint adapter circuit to adjust the output charge current from a charger circuit of the charging receiver circuit to accommodate the deviation as much as it is able (e.g., decreasing the output charge current from the charger circuit decreases the power drawn by the charging receiver load and decreases the charging power monitored at the charger circuit, and increasing the output charge current from the charger circuit increases the power drawn by the charging receiver load and increases the charging power monitored at the charger circuit).

Figure 3:
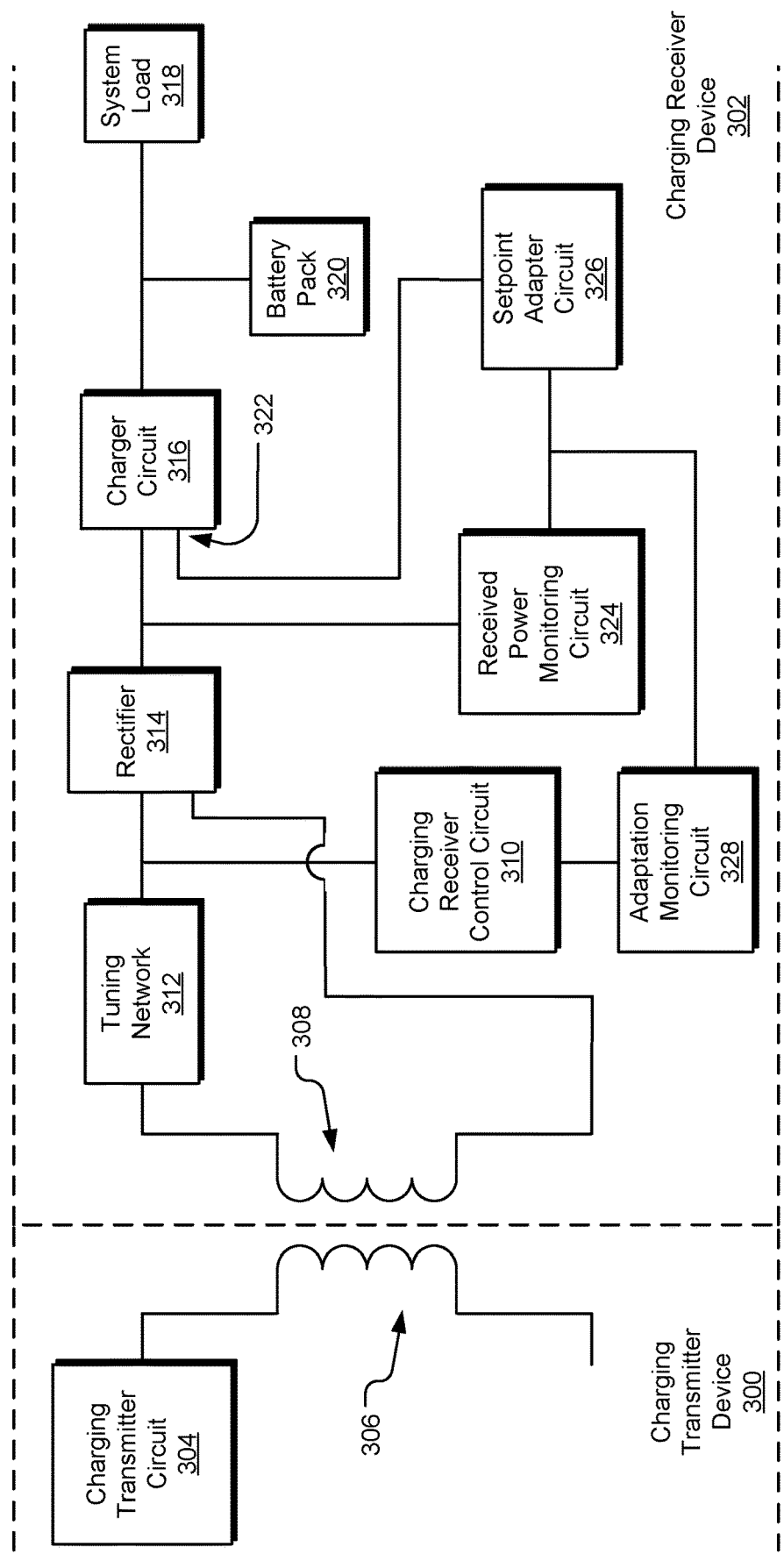
FIG. 3 illustrates a block diagram of an example charging transmitter device and an example charging receiver device.

FIG. 3 illustrates a block diagram of an example charging transmitter device 300 and an example charging receiver device 302. The charging transmitter device 300 includes a charging transmitter circuit 304 and a charging transmitter coil 306. The charging transmitter circuit 304 controls the AC signal provided to the charging transmitter coil 306 for power transfer to the charging receiver device 302. The charging receiver device 302 includes a corresponding charging receiver coil 308 and a charging receiver control circuit 310. These two coils provide the energy transfer structure between the two devices, and in some implementations, the two coils also provide a communications channel between the two devices. For example, according to a wireless charging protocol, the charging receiver control circuit 310 can signal the charging transmitter circuit 304 through the coils to increase or decrease the power supplied by the charging transmitter circuit 304 through the charging transmitter coil 306. Such communications can be bi-directional through the coils. Other communications channels may also be employed (e.g., Bluetooth, NFC).

The charging receiver device 302 receives the transferred power as an AC receiver voltage signal through the charging receiver coil 308. A tuning network 312, which may include one or more tuning capacitors, acts to improve power transfer between the charging transmitter device 300 and the charging receiver device 302 by matching the input impedance of the charging receiver device 302 to the load impedance of the charging transmitter device 300.

A rectifier 314 converts the AC (alternating current) receiver voltage signal from the charging receiver coil 308 to a positive rectified receiver voltage signal (DC—Direct Current) for input to a charger circuit 316. In one implementation, the charger circuit 316 includes a voltage converter circuit (e.g., a buck converter circuit). In another implementation, the charger circuit 316 includes a low-drop-out (LDO) charger circuit. In yet another implementation, the charger circuit 316 includes both a voltage converter circuit (e.g., a buck converter circuit) and an LDO charger circuit, and the monitored charging power is measured as a function of the rectified receiver voltage input between the voltage converter and the low-drop-out charger. The charger circuit 316 supplies charge current to drive a system load 318 and/or to charge a battery pack 320.

In one implementation, the charging power, which is a function of the rectified receiver voltage input to a charger circuit 316 of the charging receiver device 302, is monitored by a received power monitoring circuit 324. If the received power monitoring circuit 324 detects a deviation between this charging power (e.g., as a function of the rectified receiver voltage to the charger circuit 316) and the target charge power, the received power monitoring circuit 324 controls a setpoint adapter circuit 326 to increase or decrease the output charge current from the charger circuit 316, which results in an increase or decrease, respectively, of the charging power at the charger circuit 316.

In one implementation, the output charge current of the charger circuit 316 is controlled according to the resistance seen at a setpoint terminal 322 of the charger circuit 316. When the resistance at the setpoint terminal 322 is reduced, the output charge current of the charger circuit 316 increases and the rectified receiver voltage input to the charger circuit 316 decreases. When the resistance at the setpoint terminal 322 is increased, the output charge current of the charger circuit 316 decreases, and the rectified receiver voltage input to the charger circuit 316 increases. Accordingly, the setpoint terminal of the charger circuit 316 adjusts the charger circuit 316 output current and, in doing so, adjusts the rectified receiver voltage to the charger circuit 316. In other implementations, the rectified receiver voltage at the charger circuit 316 may be controlled at the setpoint terminal 322 according to a voltage or current applied to that terminal.

In one implementation, the charging power is made adjustable relative to the target charge power by connecting the setpoint terminal 322 of the charger circuit 316 through a setpoint adapter circuit 326 (e.g., through a variable impedance network to ground). In one implementation, the setpoint adapter circuit 326 includes a variable impedance network (e.g., see the schematic portion of FIG. 4). An alternative implementation may include without limitation adjusting the setpoint through I2C (a serial protocol for a two-wire interface), using an analog-to-digital converter to monitor the rectified receiver voltage and communicate that rectified receiver voltage to the charger circuit 316.

In the disclosed technology, the received power monitoring circuit 324 monitors the charging power received by the charging receiver device 302 at the output of the rectifier 314 or at the input or some intermediate stage of the charger circuit 316 (although received power can be monitored at other points in the circuitry). For example, in one implementation, the received charging power is represented by a rectified receiver voltage monitored at the output of the rectifier 314. In another implementation, the received charging power is represented by a rectified receiver voltage monitored as input to some intermediate stage of the charger circuit 316 (e.g., an output of a voltage converter connected to an input of an LDO charger in a multi-stage charger circuit 316). The received power monitoring circuit 324 detects any deviation of the received charging power (e.g., as represented by a rectified receiver voltage at the charger circuit 316) from the target charge power of the charging receiver circuit.

In one implementation, the target charge power is set by a reference voltage in the received power monitoring circuit 324. The target charge power can also be limited to one or both of a maximum (subject to charging constraints of the charging receiver circuit and associated load(s)) and minimum (subject to operational constraints of charging receiver circuit components—e.g., the charging receiver control circuit 310 can have a minimum power supply requirement for effective operation).

In the illustrated implementation, an adaptation monitoring circuit 328 monitors the output of the received power monitoring circuit 324. In one implementation, the adaptation monitoring circuit 328 may be implemented by monitoring the output of the received power monitoring circuit 324 using a general-purpose input-output (GPIO) terminal of a microcontroller (MCU). If the received power monitoring circuit 324 has detected a deviation between the target charge power and the charging power at the charger circuit 316, the received power monitoring circuit 324 controls the setpoint adapter circuit 326 to adjust the output charge current setpoint (and therefore the rectified receiver voltage setpoint) at the charger circuit 316. The adaptation monitor circuit 328 can determine that such an adjustment is being made and therefore notify the charging receiver control circuit 310 to request more power from the charging transmitter device 300, responsive to determining that the received power monitoring circuit has reduced the output charge current setpoint of the charger circuit 316. The adaptation monitor circuit 328 can also notify the charging receiver control circuit 310 to request less power from the charging transmitter device 300, responsive to determining that the received power monitoring circuit 324 has increased the output charge current setpoint of the charger circuit 316.

The adaptive loading circuitry described herein may be implemented in analog circuitry, digital circuitry, or a combination of both, with all options potentially being managed by power control software executable by one or more processors and stored in memory of the computing device.

Figure 4:
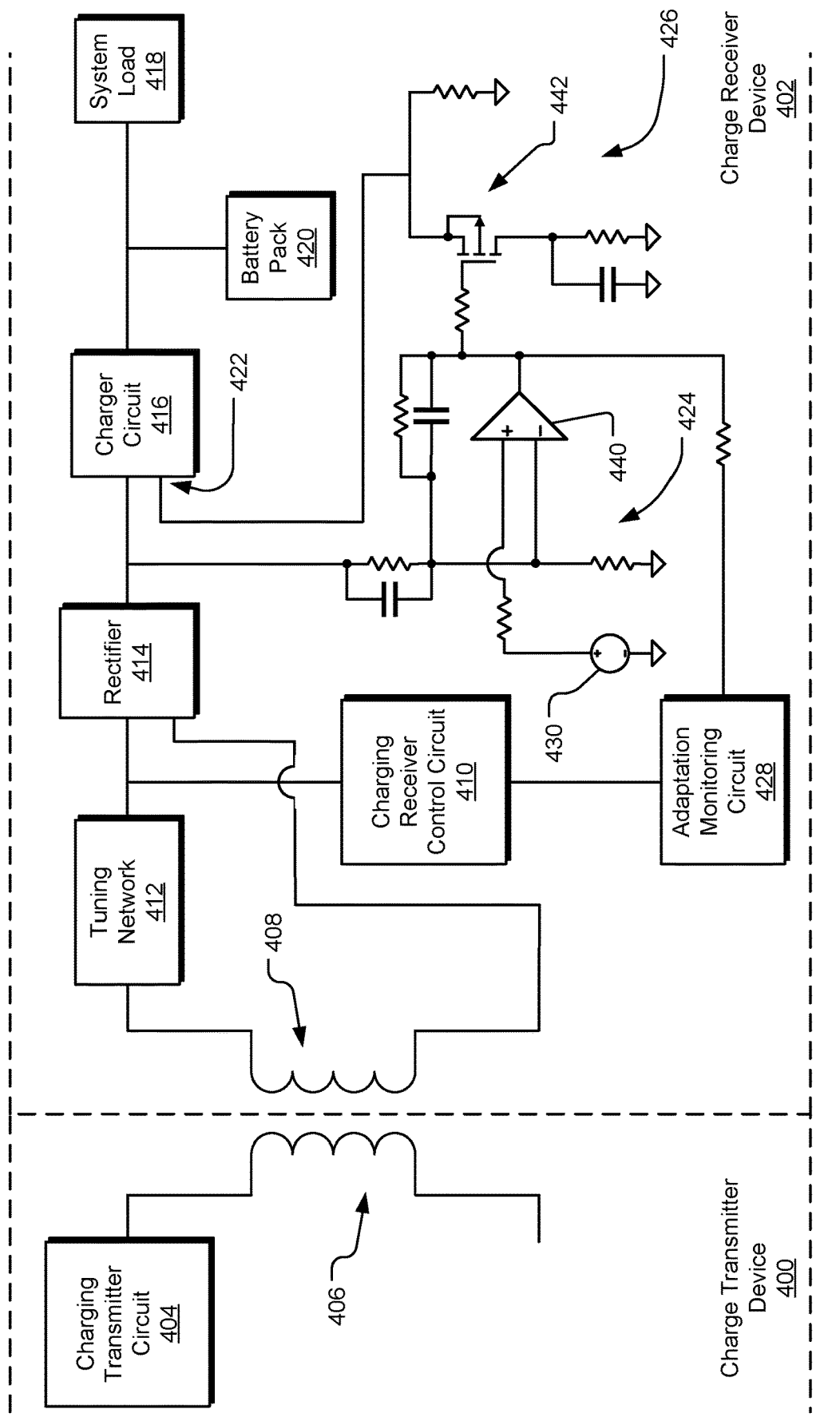
FIG. 4 illustrates a block diagram of an example charging transmitter device and an example charging receiver device, with a schematic implementation of an example received power monitoring circuit and an example setpoint adapter circuit.

FIG. 4 illustrates a block diagram of an example charging transmitter device 400 and an example charging receiver device 402, with a schematic implementation of an example received power monitoring circuit 424 and an example setpoint adapter circuit 426. The charging transmitter device 400 includes a charging transmitter circuit 404 and a charging transmitter coil 406. The charging transmitter circuit 404 controls the AC signal provided to the charging transmitter coil 406 for power transfer to the charging receiver device 402. The charging receiver device 402 includes a corresponding charging receiver coil 408 and a charging receiver control circuit 410. These two coils provide the energy transfer structure between the two devices, and in some implementations, the two coils also provide a communications channel between the two devices. For example, according to a wireless charging protocol, the charging receiver control circuit 410 can signal the charging transmitter circuit 404 through the coils to increase or decrease the charging power supplied by the charging transmitter circuit 404 through the charging transmitter coil 406. Such communications can be bi-directional through the coils. Other communications channels may also be employed (e.g., Bluetooth, NFC).

The charging receiver device 402 receives the transferred power as an AC power signal through the charging receiver coil 408. A tuning network 412, which may include one or more tuning capacitors, acts to improve power transfer between the charging transmitter device 400 and the charging receiver device 402 by matching the input impedance of the charging receiver device 402 to the load impedance of the charging transmitter device 400.

A rectifier 414 converts an AC (alternating current) receiver voltage signal (representative of the AC power signal) from the charging receiver coil 408 to a positive rectified receiver voltage signal (DC—Direct Current) for input to a charger circuit 416. In one implementation, the charger circuit 416 includes a voltage converter circuit (e.g., a buck converter circuit). In another implementation, the charger circuit 416 includes a low-drop-out (LDO) charger circuit. In yet another implementation, the charger circuit 416 includes both a voltage converter circuit (e.g., a buck converter circuit) and an LDO charger circuit, and the monitored charging power is measured as a function of the rectified receiver voltage input between the voltage converter and the low-drop-out charger. The charger circuit 416 supplies charge current to drive a system load 418 and/or to charge a battery pack 420.

In one implementation, the charging power, which is a function of the rectified receiver voltage input to a charger circuit 416 of the charging receiver device 402, is monitored by a received power monitoring circuit 424. In this manner the rectified receiver voltage is representative of charging power—if the rectified receiver voltage drops, the load of the charging receiver device 402 is drawing too much power; if the rectified receiver voltage rises, the load of the charging receiver device 402 is drawing too little power. If the received power monitoring circuit 424 detects a deviation between this charging power (e.g., as a function of the rectified receiver voltage to the charger circuit 416) and the target charge power, the received power monitoring circuit 424 controls a setpoint adapter circuit 426 to increase or decrease the output charge current from the charger circuit 416, which results in an increase or decrease, respectively, of the charging power at the charger circuit 416.

In one implementation, the output charge current of the charger circuit 416 is controlled according to the resistance seen at a setpoint terminal 422 of the charger circuit 416. When the resistance at the setpoint terminal 422 is reduced, the output charge current of the charger circuit 416 increases and the rectified receiver voltage input to the charger circuit 416 decreases. When the resistance at the setpoint terminal 422 is increased, the output charge current of the charger circuit 416 decreases, and the rectified receiver voltage input to the charger circuit 416 increases. Accordingly, the setpoint terminal of the charger circuit 416 adjusts the charger circuit 416 output current and, in doing so, adjusts the rectified receiver voltage to the charger circuit 416. In other implementations, the rectified receiver voltage at the charger circuit 416 may be controlled at the setpoint terminal 422 according to a voltage applied to that terminal.

In one implementation, the charging power is made adjustable relative to the target charge power by connecting the setpoint terminal 422 of the charger circuit 416 through a setpoint adapter circuit 426 (e.g., through a variable impedance network to ground). In one implementation, the setpoint adapter circuit 426 includes a variable impedance network. An alternative implementation may include without limitation adjusting the setpoint through I2C (a serial protocol for a two-wire interface), using an analog-to-digital converter to monitor the rectified receiver voltage and communicate that rectified receiver voltage to the charger circuit 416.

In the disclosed technology, the received power monitoring circuit 424 monitors the charging power received by the charging receiver device 402 at the output of the rectifier 414 or at the input or some intermediate stage of the charger circuit 416 (although received power can be monitored at other points in the circuitry). For example, in one implementation, the received charging power is represented by a rectified receiver voltage monitored at the output of the rectifier 414. In another implementation, the received charging power is represented by a rectified receiver voltage monitored as input to some intermediate stage of the charger circuit 416 (e.g., an output of a voltage converter connected to an input of an LDO charger in a multi-stage charger circuit 416). The received power monitoring circuit 424 detects any deviation of the received charging power (e.g., as represented by the rectified receiver voltage at the charger circuit 416) from the target charge power of the charging receiver circuit.

In one implementation, the target charge power is set by a reference voltage 430 in the received power monitoring circuit 424. The target charge power can also be limited to one or both of a maximum (subject to charging constraints of the charging receiver circuit and associated load(s)) and minimum (subject to operational constraints of charging receiver circuit components—e.g., the charging receiver control circuit 410 can have a minimum power supply requirement for effective operation).

In the illustrated implementation, an adaptation monitoring circuit 428 monitors the output of the received power monitoring circuit 424. In one implementation, the adaptation monitoring circuit 428 may be implemented by monitoring the output of the received power monitoring circuit 424 using a general-purpose input-output (GPIO) terminal of a microcontroller (MCU). If the received power monitoring circuit 424 has detected a deviation between the target charge power and the charging power at the charger circuit 416, the received power monitoring circuit 424 controls the setpoint adapter circuit 426 to adjust the output charge current setpoint (and therefore the rectified receiver voltage setpoint) at the charger circuit 416. The adaptation monitor circuit 428 can determine that such an adjustment is being made and therefore notify the charging receiver control circuit 410 to request more power from the charging transmitter device 400, responsive to determining that the received power monitoring circuit has reduced the output charge current setpoint of the charger circuit 416. The adaptation monitor circuit 428 can also notify the charging receiver control circuit 410 to request less power from the charging transmitter device 400, responsive to determining that the received power monitoring circuit 424 has increased the output charge current setpoint of the charger circuit 416.

In the illustrated implementation, an op amp 440 of the received power monitoring circuit 424 monitors the rectified receiver voltage to the charger circuit 416. As the op amp 440 detects deviations between the rectified receiver voltage and the target charge power (e.g., as set by the reference voltage 430), the op amp 440 drives a transistor 442 of the setpoint adapter circuit 426 to increase or decrease the resistance seen by the setpoint terminal 422 of the charger circuit 416. When the transistor 442 is driven in the linear region, the transistor 442 presents a variable impedance in the setpoint adapter circuit 426 to contribute to the increase/decrease of the resistance seen by the setpoint terminal 422 of the charger circuit 416. In this manner, the received power monitoring circuit 424 monitors the rectified receiver voltage to the charging circuit 416, detects any deviations, and dynamically adjusts the setpoint of the charger circuit 416 accordingly (which adjusts the output charge current at the load until the rectified receiver voltage stabilizes at the target charging rate, representing that the power draw is matched to the power available via the wireless charging interface).

The adaptive loading circuitry described herein may be implemented in analog circuitry, digital circuitry, or a combination of both, with all options potentially being managed by power control software executable by one or more processors and stored in memory of the computing device.

Figure 5:
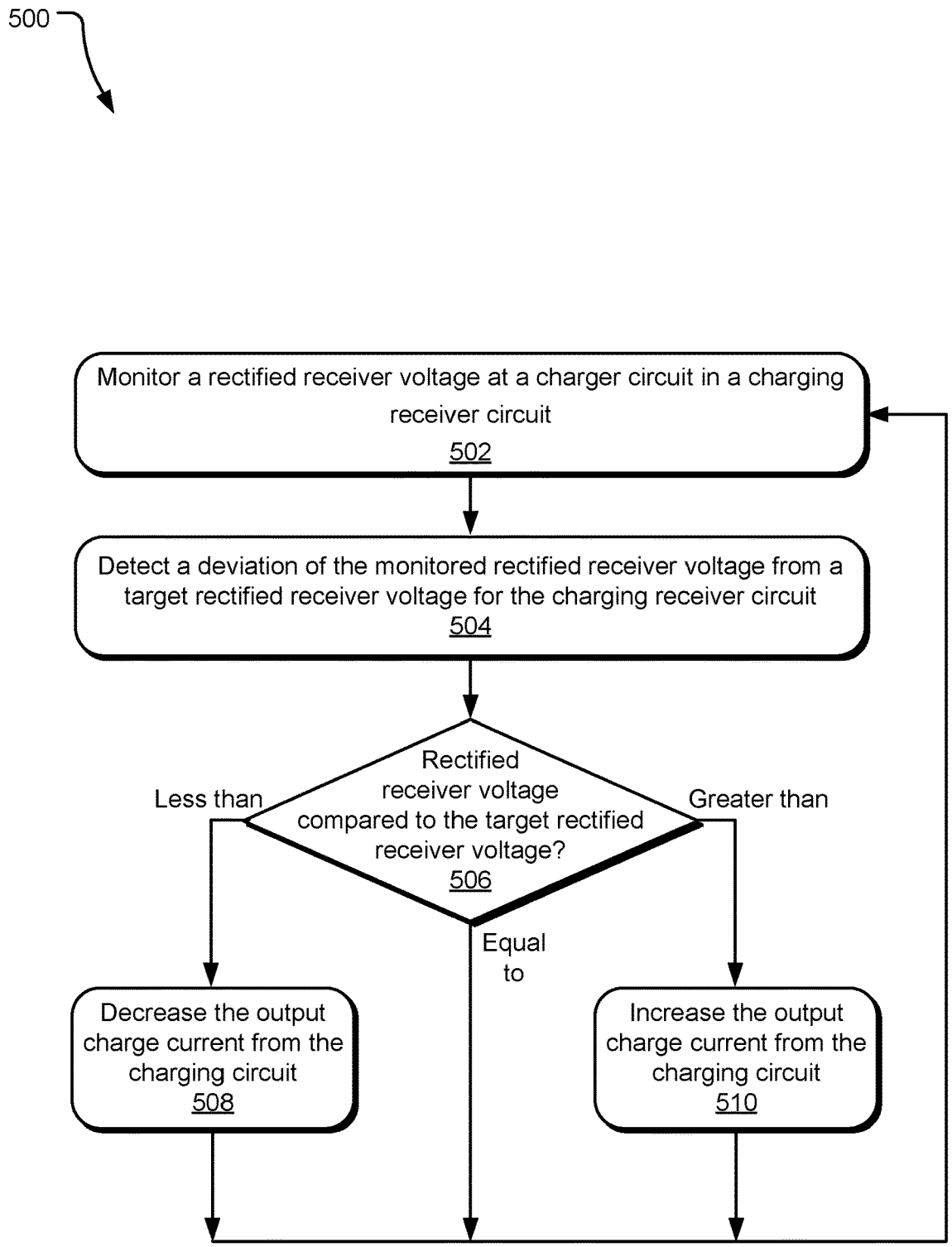
FIG. 5 illustrates operations for adaptively loading a wireless charging receiver.

FIG. 5 illustrates operations 500 for adaptively loading a wireless charging receiver. A monitoring operation 502 monitors a rectified receiver voltage at a charger circuit of a charging receiver circuit. A detection operation 504 detects a deviation of the monitored rectified receiver voltage from a target rectified receiver voltage for the charging receiver circuit.

A decision operation 506 evaluates the monitored rectified receiver voltage compared to the target rectified receiver voltage. If the monitored rectified receiver voltage is less than the target rectified receiver voltage, an adjustment operation 508 decreases the output charge current from the charger circuit, which increases the rectified receiver voltage at the charger circuit. If the monitored rectified receiver voltage is greater than the target rectified receiver voltage, an adjustment operation 510 increases the output charge current from the charger circuit, which decreases the rectified receiver voltage at the charger circuit. If the monitored rectified receiver voltage is at the target rectified receiver voltage, then no adjustment to the output charge current need be made. Monitoring by the monitoring operation 502 is continued for all three conditions.

The operation 500 may also include additional operations for an adaptation monitor circuit to determine that an adjustment to the setpoint is being made (e.g., as detected at the output of an op amp of a received power monitoring circuit to a setpoint adapter circuit) and therefore notify a charging receiver control circuit to request more transmitted power from a charging transmitter device, responsive to determining that the received power monitoring circuit has reduced the output charge current setpoint of the charger circuit. The adaptation monitor circuit can also notify the charging receiver control circuit to request less transmitted power from the charging transmitter device, responsive to determining that the received power monitoring circuit has increased the output charge current setpoint of the charger circuit.

Figure 6:
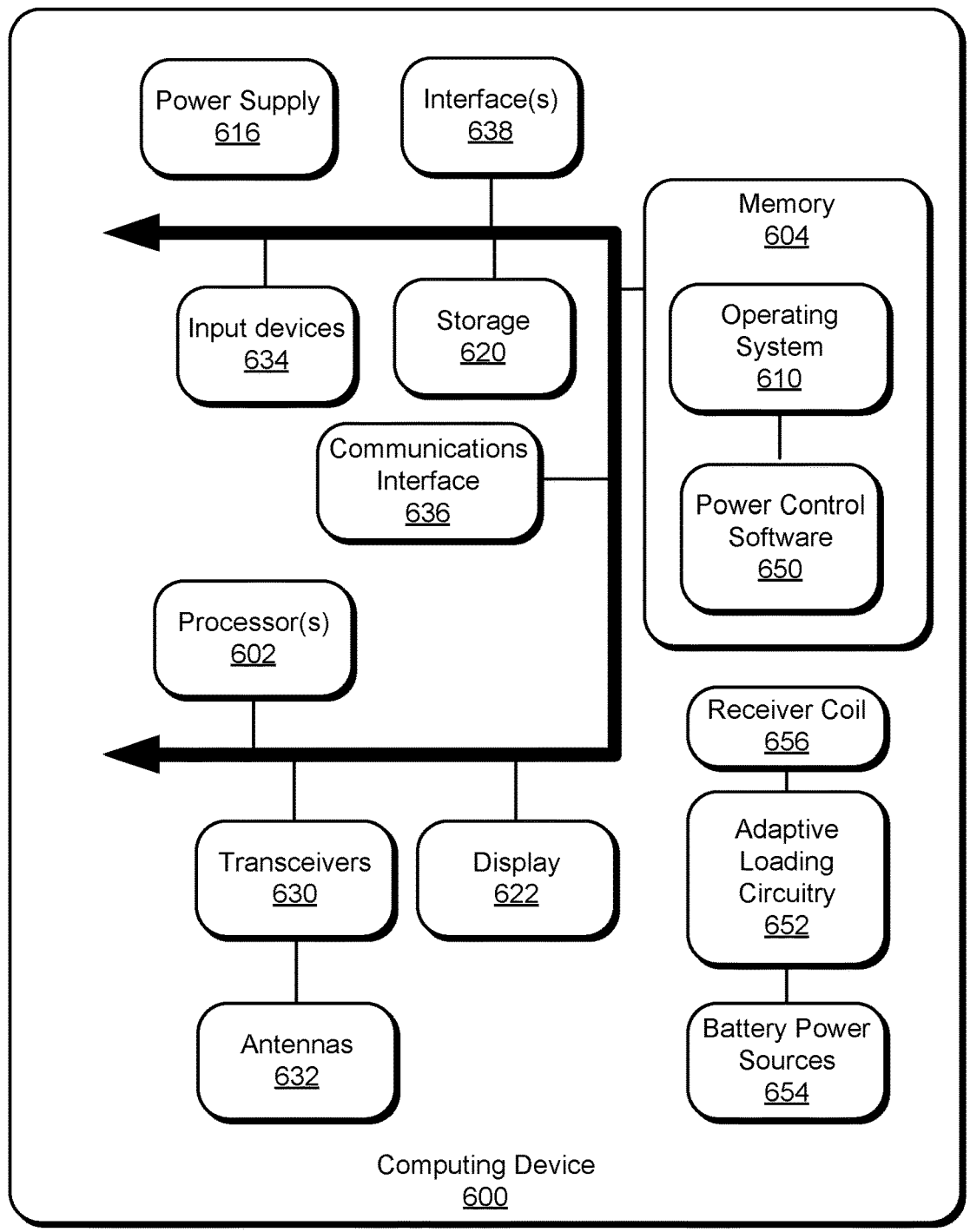
FIG. 6 illustrates an exemplary computing device for implementing the features and operations of the described technology.

FIG. 6 illustrates an exemplary computing device 600 for implementing the features and operations of the described technology. The computing device 600 is an example charging receiver device and may be a client device, such as a laptop, mobile device, desktop, tablet; a server/cloud device; internet-of-things device; an electronic accessory; or other chargeable electronic devices. The computing device 600 includes one or more processor(s) 602, and a memory 604. The memory 604 generally includes both volatile memory (e.g., RAM) and non-volatile memory (e.g., flash memory). An operating system 610 resides in the memory 604 and is executed by the processor(s) 602.

In an example computing device 600, as shown in FIG. 6, one or more modules or segments, such as power control software 650, application modules, and other modules, are loaded into the operating system 610 on the memory 604 and/or storage 620 and executed by processor(s) 602. The storage 620 may be stored battery characteristics, target charge power ranges, system load requirements, and other data and be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources. The computing device 600 supports wireless charging through a receiver coil 656. In one implementation, adaptive loading circuitry 652 is electrically coupled to the receiver coil 656 to charge one or more battery power sources 654 or to drive to one or more system loads in the computing device 600.

The computing device 600 may include one or more communication transceivers 630 which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of communication device. The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638 such as a serial port interface, parallel port, or universal serial bus (USB). The computing device 600 may further include a display 622, such as a touch screen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

An example charging receiver device for adapting wireless charging receiver loading is provided. The charging receiver device is configured to receive energy wirelessly transferred from a wireless charging coil of a charging transmitter device. The charging receiver device includes a wireless charging receiver coil configured to receive the energy wirelessly transferred from the wireless charging coil of the charging transmitter device, the energy resulting in a charging power received by the charging receiver device and a charger circuit electrically coupled to the wireless charging receiver coil to receive the charging power. The charging power is a function of a rectified receiver voltage at the charger circuit. A received power monitoring circuit is electrically coupled to the charger circuit and is configured to monitor the rectified receiver voltage at the charger circuit, detect a deviation of the monitored rectified receiver voltage from a target rectified receiver voltage for the charging receiver device, and decrease a charge current output from the charger circuit to increase the rectified receiver voltage toward the target rectified receiver voltage, responsive to determining that the detected deviation indicates that the monitored rectified receiver voltage is less than the target rectified receiver voltage.

Another charging receiver device of any preceding device is provided, wherein the received power monitoring circuit is further configured to increase the charge current output from the charger circuit to decrease the rectified receiver voltage toward the target rectified receiver voltage, responsive to determining that the detected deviation indicates that the monitored rectified receiver voltage is greater than the target rectified receiver voltage.

Another charging receiver device of any preceding device is provided, wherein the rectified receiver voltage is monitored at an input to the charger circuit.

Another charging receiver device of any preceding device further includes a setpoint adapter circuit electrically coupled to the received power monitoring circuit, the setpoint adapter circuit being adjustable by the received power monitoring circuit, responsive to detecting the deviation of the monitored rectified receiver voltage from the target rectified receiver voltage for the charging receiver device.

Another charging receiver device of any preceding device further includes a setpoint adapter circuit electrically coupled to the charger circuit, the setpoint adapter circuit being configured to adjust the charge current output from the charger circuit, responsive to detecting the deviation of the monitored rectified receiver voltage from the target rectified receiver voltage for the charging receiver device.

Another charging receiver device of any preceding device further includes a setpoint adapter circuit electrically coupled to the received power monitoring circuit and the charger circuit, the setpoint adapter circuit including a variable impedance network controlled by the received power monitoring circuit.

Another charging receiver device of any preceding device further includes a charging receiver control circuit electrically coupled to the wireless charging receiver coil and configured to communicate with the charging transmitter device and an adaptation monitoring circuit electrically coupled to the received power monitoring circuit to monitor output of the received power monitoring circuit. The adaptation monitoring circuit is configured to request through the charging receiver control circuit more transmitted power from the charging transmitter device, responsive to determining that the received power monitoring circuit has reduced the charge current output from the charger circuit.

Another charging receiver device of any preceding device is provided, wherein the charger circuit includes a voltage converter and a low-drop-out charger, and the monitored rectified receiver voltage is monitored between the voltage converter and the low-drop-out charger.

Another charging receiver device of any preceding device further includes a load including at least one of a system load and a battery pack, wherein the charger circuit is electrically coupled to supply the charging power to the load.

An example method of adapting wireless charging receiver loading in a charging receiver device is provided. The charging receiver device includes a wireless charging coil of a charging receiver circuit. The method includes monitoring a rectified receiver voltage at a charger circuit in the charging receiver device. The rectified receiver voltage at the charger circuit results from energy wirelessly transferred from a wireless charging coil of a charging transmitter device to the wireless charging coil of the charging receiver device. The method further includes detecting a deviation of the monitored rectified receiver voltage from a target rectified receiver voltage for the charging receiver circuit and decreasing a charge current output from a charger circuit of the charging receiver device to increase the rectified receiver voltage toward the target rectified receiver voltage, responsive to determining that the detected deviation indicates that the monitored rectified receiver voltage is less than the target rectified receiver voltage.

Another example method of any preceding method further includes increasing the charge current output from the charger circuit to decrease the rectified receiver voltage toward the target rectified receiver voltage, responsive to determining that the detected deviation indicates that the monitored rectified receiver voltage is greater than the target rectified receiver voltage.

Another example method of any preceding method further includes monitoring detection of the deviation of the monitored rectified receiver voltage from the target rectified receiver voltage for the charging receiver circuit and requesting more transmitted power from the charging transmitter device, responsive to determining that the detected deviation indicates that the monitored rectified receiver voltage is less than the target rectified receiver voltage.

An example charging receiver circuit for adapting wireless charging receiver loading is provided. The charging receiver circuit is configured to receive energy wirelessly transferred from a wireless charging coil of a charging transmitter device. The charging receiver circuit includes a charger circuit configured to receive the energy wirelessly transferred from the wireless charging coil of the charging transmitter device. The energy results in a charging power received by the charging receiver circuit. The charging power is a function of a rectified receiver voltage at the charger circuit. A received power monitoring circuit is electrically coupled to the charger circuit and is configured to monitor the rectified receiver voltage at the charger circuit, detect a deviation of the monitored rectified receiver voltage from a target rectified receiver voltage for the charging receiver circuit, and decrease a charge current output from the charger circuit to increase the rectified receiver voltage toward the target rectified receiver voltage, responsive to determining that the detected deviation indicates that the monitored rectified receiver voltage is less than the target rectified receiver voltage.

An example charging receiver circuit of any preceding circuit is provided, wherein the received power monitoring circuit is further configured to increase the charge current output from the charger circuit to decrease the rectified receiver voltage toward the target rectified receiver voltage, responsive to determining that the detected deviation indicates that the monitored rectified receiver voltage is greater than the target rectified receiver voltage.

An example charging receiver circuit of any preceding circuit is provided, wherein the rectified receiver voltage is monitored at an input to the charger circuit.

An example charging receiver circuit of any preceding circuit further includes a setpoint adapter circuit electrically coupled to the received power monitoring circuit, the setpoint adapter circuit being adjustable by the received power monitoring circuit, responsive to detecting the deviation of the monitored rectified receiver voltage from the target rectified receiver voltage for the charging receiver circuit.

An example charging receiver circuit of any preceding circuit further includes a setpoint adapter circuit electrically coupled to the charger circuit, the setpoint adapter circuit being configured to adjust the charge current output from the charger circuit, responsive to detecting the deviation of the monitored rectified receiver voltage from the target rectified receiver voltage for the charging receiver circuit.

An example charging receiver circuit of any preceding circuit further includes a setpoint adapter circuit electrically coupled to the received power monitoring circuit and the charger circuit, the setpoint adapter circuit including a variable impedance network controlled by the received power monitoring circuit.

An example charging receiver circuit of any preceding circuit further includes a charging receiver control circuit configured to communicate with the charging transmitter device and an adaptation monitoring circuit electrically coupled to the received power monitoring circuit to monitor output of the received power monitoring circuit. The adaptation monitoring circuit is configured to request through the charging receiver control circuit more transmitted power from the charging transmitter device, responsive to determining that the received power monitoring circuit has reduced the charge current output from the charger circuit.

An example charging receiver circuit of any preceding circuit is provided, wherein the charger circuit includes a voltage converter and a low-drop-out charger, and the monitored rectified receiver voltage is monitored between the voltage converter and the low-drop-out charger.

An example system of adapting wireless charging receiver loading in a charging receiver device is provided. The charging receiver device includes a wireless charging coil of a charging receiver circuit. The system includes means for monitoring a rectified receiver voltage at a charger circuit in the charging receiver device. The rectified receiver voltage at the charger circuit results from energy wirelessly transferred from a wireless charging coil of a charging transmitter device to the wireless charging coil of the charging receiver device. The system further includes means for detecting a deviation of the monitored rectified receiver voltage from a target rectified receiver voltage for the charging receiver circuit and means for decreasing a charge current output from a charger circuit of the charging receiver device to increase the rectified receiver voltage toward the target rectified receiver voltage, responsive to determining that the detected deviation indicates that the monitored rectified receiver voltage is less than the target rectified receiver voltage.

Another example system of any preceding system further includes means for increasing the charge current output from the charger circuit to decrease the rectified receiver voltage toward the target rectified receiver voltage, responsive to determining that the detected deviation indicates that the monitored rectified receiver voltage is greater than the target rectified receiver voltage.

Another example system of any preceding system further includes means for monitoring detection of the deviation of the monitored rectified receiver voltage from the target rectified receiver voltage for the charging receiver circuit and means for requesting more transmitted power from the charging transmitter device, responsive to determining that the detected deviation indicates that the monitored rectified receiver voltage is less than the target rectified receiver voltage.

A number of implementations of the described technology have been described. Nevertheless, it will be understood that various modifications can be made without departing from the spirit and scope of the recited claims.

What is claimed is:

1. A charging receiver device for adapting wireless charging receiver loading, the charging receiver device being configured to receive energy wirelessly transferred from a wireless charging coil of a charging transmitter device, the charging receiver device comprising:
   a wireless charging receiver coil configured to receive the energy wirelessly transferred from the wireless charging coil of the charging transmitter device, the energy resulting in a charging power received by the charging receiver device;
   a charger circuit electrically coupled to the wireless charging receiver coil to receive the charging power, the charging power being a function of a rectified receiver voltage at the charger circuit;
   a received power monitoring circuit electrically coupled to the charger circuit, the received power monitoring circuit being configured to
   monitor the rectified receiver voltage at the charger circuit,
   detect a deviation of the monitored rectified receiver voltage from a target rectified receiver voltage for the charging receiver device, and
   decrease a charge current output from the charger circuit to increase the rectified receiver voltage toward the target rectified receiver voltage, responsive to determining that the detected deviation indicates that the monitored rectified receiver voltage is less than the target rectified receiver voltage.

2. The charging receiver device of claim 1, wherein the received power monitoring circuit is further configured to increase the charge current output from the charger circuit to decrease the rectified receiver voltage toward the target rectified receiver voltage, responsive to determining that the detected deviation indicates that the monitored rectified receiver voltage is greater than the target rectified receiver voltage.

3. The charging receiver device of claim 1, wherein the rectified receiver voltage is monitored at an input to the charger circuit.

4. The charging receiver device of claim 1, further comprising:
   a setpoint adapter circuit electrically coupled to the received power monitoring circuit, the setpoint adapter circuit being adjustable by the received power monitoring circuit, responsive to detecting the deviation of the monitored rectified receiver voltage from the target rectified receiver voltage for the charging receiver device.

5. The charging receiver device of claim 1, further comprising:
   a setpoint adapter circuit electrically coupled to the charger circuit, the setpoint adapter circuit being configured to adjust the charge current output from the charger circuit, responsive to detecting the deviation of the monitored rectified receiver voltage from the target rectified receiver voltage for the charging receiver device.

6. The charging receiver device of claim 1, further comprising:
   a setpoint adapter circuit electrically coupled to the received power monitoring circuit and the charger circuit, the setpoint adapter circuit including a variable impedance network controlled by the received power monitoring circuit.

7. The charging receiver device of claim 1, further comprising:
   a charging receiver control circuit electrically coupled to the wireless charging receiver coil and configured to communicate with the charging transmitter device; and
   an adaptation monitoring circuit electrically coupled to the received power monitoring circuit to monitor output of the received power monitoring circuit, the adaptation monitoring circuit being configured to request through the charging receiver control circuit more transmitted power from the charging transmitter device, responsive to determining that the received power monitoring circuit has reduced the charge current output from the charger circuit.

8. The charging receiver device of claim 1, wherein the charger circuit includes a voltage converter and a low-dropout charger, and the monitored rectified receiver voltage is monitored between the voltage converter and the low-dropout charger.

9. The charging receiver device of claim 1, further comprising:
   a load including at least one of a system load and a battery pack, wherein the charger circuit is electrically coupled to supply the charging power to the load.

10. The charging receiver device of claim 1, wherein the deviation represents a decrease in voltage away from the target rectified receiver voltage.

11. The charging receiver device of claim 1, wherein the charging receiver device is configured to request more transmitted power from the charging transmitter device, responsive to determining that the received power monitoring circuit has reduced the charge current output from the charger circuit.

12. A method of adapting wireless charging receiver loading in a charging receiver device, the charging receiver device including a wireless charging coil of a charging receiver circuit, the method comprising:
   monitoring a rectified receiver voltage at a charger circuit in the charging receiver device, the rectified receiver voltage at the charger circuit resulting from energy wirelessly transferred from a wireless charging coil of a charging transmitter device to the wireless charging coil of the charging receiver device;
   detecting a deviation of the monitored rectified receiver voltage from a target rectified receiver voltage for the charging receiver circuit; and
   decreasing a charge current output from a charger circuit of the charging receiver device to increase the rectified receiver voltage toward the target rectified receiver voltage, responsive to determining that the detected deviation indicates that the monitored rectified receiver voltage is less than the target rectified receiver voltage.

13. The method of claim 12, further comprising:

increasing the charge current output from the charger circuit to decrease the rectified receiver voltage toward the target rectified receiver voltage, responsive to determining that the detected deviation indicates that the monitored rectified receiver voltage is greater than the target rectified receiver voltage.

14. The method of claim 12, further comprising:

monitoring detection of the deviation of the monitored rectified receiver voltage from the target rectified receiver voltage for the charging receiver circuit; and requesting more transmitted power from the charging transmitter device, responsive to determining that the detected deviation indicates that the monitored rectified receiver voltage is less than the target rectified receiver voltage.

15. A charging receiver circuit for adapting wireless charging receiver loading, the charging receiver circuit being configured to receive energy wirelessly transferred from a wireless charging coil of a charging transmitter device, the charging receiver circuit comprising:

a charger circuit configured to receive the energy wirelessly transferred from the wireless charging coil of the charging transmitter device, the energy resulting in a charging power received by the charging receiver circuit, the charging power being a function of a rectified receiver voltage at the charger circuit;

a received power monitoring circuit electrically coupled to the charger circuit, the received power monitoring circuit being configured to monitor the rectified receiver voltage at the charger circuit, detect a deviation of the monitored rectified receiver voltage from a target rectified receiver voltage for the charging receiver circuit, and increase an impedance at a setpoint terminal of the charger circuit to increase the rectified receiver voltage toward the target rectified receiver voltage, responsive to determining that the detected deviation indicates that the monitored rectified receiver voltage is less than the target rectified receiver voltage.

16. The charging receiver circuit of claim 15, wherein the received power monitoring circuit is further configured to increase a charge current output from the charger circuit by the increase in the impedance at the setpoint terminal to decrease the rectified receiver voltage toward the target rectified receiver voltage, responsive to determining that the detected deviation indicates that the monitored rectified receiver voltage is greater than the target rectified receiver voltage.

17. The charging receiver circuit of claim 15, wherein the rectified receiver voltage is monitored at an input to the charger circuit.

18. The charging receiver circuit of claim 15, further comprising:

a setpoint adapter circuit electrically coupled to the received power monitoring circuit, the setpoint adapter circuit being adjustable by the received power monitoring circuit, responsive to detecting the deviation of the monitored rectified receiver voltage from the target rectified receiver voltage for the charging receiver circuit.

19. The charging receiver circuit of claim 15, further comprising:

a setpoint adapter circuit electrically coupled to the charger circuit, the setpoint adapter circuit being configured to adjust a charge current output from the charger circuit by the increase of the impedance at the setpoint terminal, responsive to detecting the deviation of the monitored rectified receiver voltage from the target rectified receiver voltage for the charging receiver circuit.

20. The charging receiver circuit of claim 15, further comprising:

a setpoint adapter circuit electrically coupled to the received power monitoring circuit and the charger circuit, the setpoint adapter circuit including a variable impedance network controlled by the received power monitoring circuit.

21. The charging receiver circuit of claim 15, further comprising:

a charging receiver control circuit configured to communicate with the charging transmitter device; and an adaptation monitoring circuit electrically coupled to the received power monitoring circuit to monitor output of the received power monitoring circuit, the adaptation monitoring circuit being configured to request through the charging receiver control circuit more transmitted power from the charging transmitter device, responsive to determining that the received power monitoring circuit has reduced a charge current output from the charger circuit by the increase of the impedance at the setpoint terminal.

22. The charging receiver circuit of claim 15, wherein the charger circuit includes a voltage converter and a low-dropout charger, and the monitored rectified receiver voltage is monitored between the voltage converter and the low-dropout charger.

* * * * *